Oct. 6, 1964   J. W. ALLEN ETAL   3,152,302
ELECTROMAGNETIC TESTING APPARATUS HAVING A ROTATING
APERTURED CYLINDER FOR SPIRALLY SCANNING
CYLINDRICAL WORKPIECES
Filed May 16, 1962
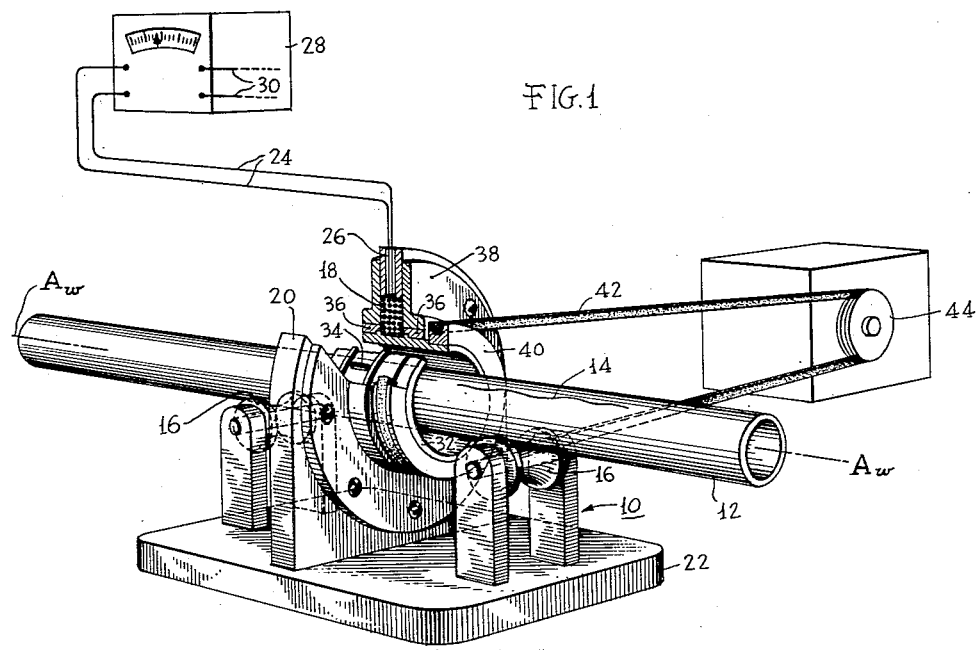
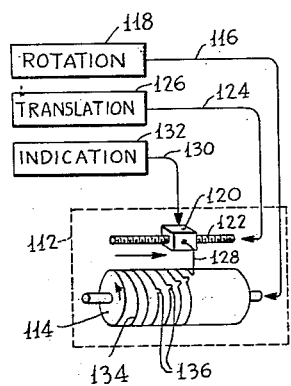
INVENTORS
John W. Allen
Roy A. Nance
BY
Thomas A. Davenport
ATTORNEY 3,152,302
ELECTROMAGNETIC TESTING APPARATUS HAVING A ROTATING APERTURED CYLINDER FOR SPIRALLY SCANNING CYLINDRICAL WORKPIECES
John W. Allen and Roy A. Nance, Malvern, Pa., assignors to The Budd Company, Philadelphia, Pa., a corporation of Pennsylvania
Filed May 16, 1962, Ser. No. 195,131
2 Claims. (Cl. 324—34)

This invention pertains to apparatus for use in electromagnetic testing and, more particularly, to an eddy current search coil apparatus for the effective detection and measurement of longitudinal discontinuities such as continuous seams and for the description of angular positions of these and other discontinuities in cylindrical workpieces.

When excited by an oscillating input and electromagnetically coupled with a metallic workpiece, the resistive and reactive impedances of an eddy current search coil are varied by changes in the properties of the workpiece. Two types of search coil arrangements, encircling and tangential, are in general use. The tangential coil or probe, is positioned tangentially of the workpieces and scans only a small sector at any given angular position. Rotation of the workpieces is usually impractical and revolution of the tangential search coil itself around the workpieces requires complex means for connection with input and output circuits.

The more frequently used encircling, or O.D. coil through which workpieces are moved longitudinally, is quite sensitive to workpiece parameters which vary along the length of the workpiece. However, conventional O.D. coil arrangements do not enable description of angular position or sensitive detection of continuous longitudinal discontinuities because of integration over an annular peripheral cross section of the workpiece. Further, most detection systems are sensitive to rate of change of search coil impedance and therefore would register only the beginning and end of a flaw extending in the direction of workpiece translation.

An improved electromagnetic testing apparatus adapting an encompassing search coil for a type of tangential probe detection whereby an effective scanning area is revolved about an extended cylindrical workpiece without cumulative rotation of the search coil is disclosed and claimed in the copending application of John W. Allen, Serial No. 150,486, filed November 6, 1961, now Patent No. 3,110,360, and assigned to the same assignee as is this application. Such an improved apparatus, while being a distinct advance in the art, requires several relatively moving parts and their attendant complexity. For many applications a simplified apparatus providing circumferential motion of an effective scanning area would be of distinct advantage.

Therefore, it is an object of this invention to provide improved electromagnetic testing apparatus adapting an encompassing search coil for tangential probe detection whereby an effective scanning area may be revolved about an extended cylindrical workpiece.

A more specific object is to provide a more efficient electromagnetic testing apparatus for rotating an effective scanning area of a stationary encompassing search coil about extended cylindrical workpieces.

In accordance with an illustrated embodiment of this invention, electromagnetic testing apparatus for the investigation of elongated cylindrical workpiece variables comprises a mount, an annular encompassing search coil fixed in position on the mount, an annular shield of an electrically conducting material contiguous with the internal surface of the search coil and having a radial aperture defining an effective scanning area, and means for rotating the shield about the axis of the coil whereby the effective scanning area is rotated about a workpiece inserted through the apparatus.

For a better understanding of the present invention, together with additional objects and advantages thereof, references should be had to the following description taken in conjunction with the accompanying drawing wherein:

FIG. 1 is a perspective view, partially broken away, illustrating a preferred embodiment of this invention in operative position; and FIG. 2 is a diagram of a read-out arrangement facilitated by this invention.

With particular reference to FIG. 1, a preferred eddy current search coil translation apparatus 10 is shown in conjunction with a generalized workpiece 12, a hollow cylindrical conduit or pipe, having nominally similar lateral cross sections. For purposes of this explanation, a generalized discontinuity 14 is assumed to exist over an incremental sector and to extend longitudinally of workpiece 12. Workpiece 12 is supported by conventional driven or idler rollers 16 with the nominal workpiece axis of symmetry $A_w$ fixed thereby.

Co-axial search coil 18, per se, may be of the O.D. type well known in the electromagnetic testing art and having an internal radius $r_c$ substantially greater than the nominal external radius $r_w$ of the workpiece 12. Search coil 18 is rigidly attached to a vertical coil support 20 mounted upon a base plate 22. The axis of symmetry of search coil 18 is arranged to coincide with the workpiece axis $A_w$.

The search coil may be coupled by lead wires 24, brought out through an aperture 26, to conventional eddy current excitation and indication apparatus at 28 and by leads 30 to additional indication and utilization devices.

With the conventional apparatus thus far described, the observable effect of longitudinal discontinuities such as that assumed at 14 would be independent of angular position. More importantly, the resolution of such apparatus is determined by the ratio of the lateral cross-section area of the defect to the lateral cross-section area of the workpiece. In many instances, however, flaws of insignificant lateral cross-section must be resolved because of their longitudinal extent.

According to this invention, a shield 32 of electrical conducting material, copper or a copper alloy for example, is interposed between the search coil 18 and the workpiece 12. If shield 32 were continuous, substantially the entire eddy current pattern would be developed therein without any penetration of the workpiece. Applicant has discovered that inclusion of a radial aperture 34 through the shield 32 disrupts continuous eddy current patterns in the shield and directs their penetration of the workpiece surface area radially opposed to the aperture. This results in concentration of an effective scanning area at a definite angular, and longitudinal, workpiece position. Further, rotation of shield 32, and hence of radial aperture 34, causes rotation of this effective scanning area.

Rotation of the effective scanning area is provided for by mounting shield 32 in bearings 36 positioned co-axially of coil 18 and workpiece axis $A_w$ by flanges 38 secured to vertical plate 20. A rotational drive for cylinder 32 may include a pulley 40 attached to shield 32 and a belt 42 extending to a driven pulley indicated at 44.

Rotation of shield 32 causes rotation of the equivalent scanning area about the workpiece surface and when the workpiece is simultaneously translated along its axis of symmetry $A_w$, a spiral search path is traced over the workpiece surface. Resolution of the electromagnetic testing apparatus depends upon the dimensions of the equivalent scanning area, a function of the dimensions of slot 34.

According to the teachings of a significant advance in electromagnetic testing disclosed and claimed in the copending application of Richard Hochschild, Serial No. 822,044, filed June 22, 1959, now Patent 3,056,081, and assigned to the same assignee as is this invention, optimum selective indications of workpiece non-uniformities is achieved when the dimensions of the equivalent scanning area are substantially smaller in the scanning direction than the larger of the two smallest characteristic non-uniformities to be distinguished. In this connection it should be understood that the effective dimension of a workpiece non-uniformity are somewhat different than its physical dimensions. Therefore, the optimum dimensions for slot 34 may best be determined empirically from a study of known artifically produced non-uniformities in sample workpieces.

FIG. 2 illustrates a type of read-out display which may be employed efficiently with the apparatus of this invention. A drum recorder 112 comprises drum 114 rotated about its axis in proportion to search point rotation via coupling 116 from the slotted shield drive means represented by block 118. Stylus 120 may be translated by a screw 122 parallel with drum of 114 in proportion to translation of the workpiece via coupling 124 from a device, such as a workpiece support roller, synchronized with that motion and represented by block 126. Stylus 128 may be moved laterally from its normal position proportional to search coil signals via coupling 130 from the indicator apparatus representing at 132.

The base tracing by stylus 128 may be a smooth spiral 134 upon which pips 136 are superimposed with the equivalent magnitude and equivalent position of workpiece discontinuities. The shape of each pip and its relative position are informative of discontinuity type. The pip repetition, as shown, may be interpreted as a pictorial representation of an axially extended discontinuity at a determinable slope with respect to the workpiece axis.

In conclusion, there have been shown and described various aspects of electromagnetic apparatus embodied according to this invention for the eddy current inspection of elongated workpieces. An essential feature of the invention is that the effective search coil scanning area is rotated continuously about the workpiece without rotation of the workpiece or any motion of the scanning coil.

While there have been described what are at present considered to be the preferred embodiments of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. Electromagnetic testing apparatus comprising a stationary workpiece-encompassing annular search coil, a hollow cylindrical shield of an electrical conducting material coaxially mounted internally of said search coil, said shield including a radial aperture therethrough, and means rotating said shield about its cylindrical axis, whereby an effective scanning area defined by said aperture is rotated about a workpiece positioned internally of said shield.

2. Electromagnetic testing apparatus for the investigation of non-uniformities in an elongated cylindrical workpiece, which apparatus comprises: means translating the workpiece parallel with its cylindrical axis, a stationary annular search coil encompassing the workpiece and defining an annular space therebetween, a hollow cylindrical shield of an electrical conducting material interposed in the annular space between said coil and the workpiece, said shield including a radial aperture therethrough defining an effective scanning area at the surface of the workpiece, and means rotating said shield about its cylindrical axis, whereby the effective scanning area is scanned in a spiral path over the surface of the workpiece.

References Cited in the file of this patent

UNITED STATES PATENTS

| | | |
|---|---|---|
| 2,938,162 | Roffman | May 28, 1960 |
| 2,998,566 | Cochran | Aug. 29, 1961 |
| 3,056,081 | Hochschild | Sept. 25, 1962 |